(12) United States Patent
Li et al.

(10) Patent No.: US 12,356,121 B2
(45) Date of Patent: Jul. 8, 2025

(54) SURVEILLANCE SYSTEM WITH FIXED CAMERA AND TEMPORARY CAMERAS

(71) Applicant: NEC Corporation, Tokyo (JP)

(72) Inventors: Lei Li, Singapore (SG); Takeshi Arikuma, Singapore (SG)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/636,458

(22) Filed: Apr. 16, 2024

(65) Prior Publication Data

US 2024/0275924 A1 Aug. 15, 2024

Related U.S. Application Data

(63) Continuation of application No. 17/684,642, filed on Mar. 2, 2022, now Pat. No. 12,035,077, which is a (Continued)

(30) Foreign Application Priority Data

Jul. 2, 2015 (SG) .......................... 10201505251X

(51) Int. Cl.
*H04N 23/69* (2023.01)
*G08B 13/196* (2006.01)
(Continued)

(52) U.S. Cl.
CPC ....... *H04N 7/181* (2013.01); *G08B 13/19643* (2013.01); *H04N 23/661* (2023.01); *H04N 23/69* (2023.01); *H04N 23/90* (2023.01)

(58) Field of Classification Search
CPC ............... H04N 7/181; H04N 5/23206; H04N 5/23296; H04N 5/247; G08B 13/19643
See application file for complete search history.

(56) References Cited

U.S. PATENT DOCUMENTS

| 7,460,148 B1 | 12/2008 | Clark | ..................... H04N 7/183 348/E7.087 |
| 2003/0214582 A1 | 11/2003 | Takahashi et al. | |

(Continued)

FOREIGN PATENT DOCUMENTS

| JP | H08-251467 A | 9/1996 |
| JP | 2003-51083 A | 2/2003 |

(Continued)

OTHER PUBLICATIONS

JP Office Action for JP Application No. 2023-115859, mailed on Jul. 23, 2024 with English Translation.

(Continued)

*Primary Examiner* — Jae N Noh
(74) *Attorney, Agent, or Firm* — Sughrue Mion, PLLC

(57) ABSTRACT

A surveillance system including a fixed camera and one or more temporary cameras and a control means coupled to the fixed camera and the one or more temporary cameras is disclosed. The control means is configured to extend coverage of the fixed camera using the one or more temporary cameras coupled to the fixed camera. Each of the one or more temporary cameras includes one or more sensors and is configured to be deployed and adjusted based on sensor data obtained from the one or more sensors of the one or more temporary cameras and from one or more fixed camera sensors co-located with the fixed camera.

10 Claims, 11 Drawing Sheets

Related U.S. Application Data continuation of application No. 17/113,974, filed on Dec. 7, 2020, now Pat. No. 11,297,282, which is a continuation of application No. 15/741,082, filed as application No. PCT/JP2016/003159 on Jul. 1, 2016, now Pat. No. 10,893,239.

(51) Int. Cl.
  *H04N 7/18* (2006.01)
  *H04N 23/661* (2023.01)
  *H04N 23/90* (2023.01)

(56) References Cited

U.S. PATENT DOCUMENTS

| | | | |
|---|---|---|---|
| 2004/0236466 A1 | 11/2004 | Ota et al. | |
| 2006/0056056 A1 | 3/2006 | Ahiska et al. | |
| 2007/0039030 A1* | 2/2007 | Romanowich | H04N 23/90 348/E7.071 |
| 2008/0284848 A1* | 11/2008 | Martin | F41H 11/02 348/143 |
| 2012/0182440 A1 | 7/2012 | Toyoda | |
| 2013/0278755 A1 | 10/2013 | Starns et al. | |
| 2013/0307972 A1 | 11/2013 | Stone et al. | |
| 2014/0250153 A1 | 9/2014 | Nixon et al. | |
| 2015/0120237 A1 | 4/2015 | Gouda | G06T 7/215 702/150 |
| 2015/0154452 A1 | 6/2015 | Bentley et al. | |
| 2016/0165620 A1 | 6/2016 | Dagen et al. | |
| 2018/0192006 A1 | 7/2018 | Li et al. | |
| 2018/0218582 A1 | 8/2018 | Hodge et al. | |

FOREIGN PATENT DOCUMENTS

| | | |
|---|---|---|
| JP | 2003-329462 A | 11/2003 |
| JP | 2004-348242 A | 12/2004 |
| JP | 2005-244279 A | 9/2005 |
| JP | 200525757 A | 9/2005 |
| JP | 2009-055180 A | 3/2009 |
| JP | 2009-157446 A | 7/2009 |
| JP | 2010-011307 A | 1/2010 |
| JP | 2010-268186 A | 11/2010 |
| JP | 2011-114580 A | 6/2011 |
| JP | 2011-176452 A | 9/2011 |
| JP | 2013-222216 A | 10/2013 |
| JP | 2015-091055 A | 5/2015 |
| JP | 2022-009671 A | 1/2022 |
| KR | 2012-0111408 A | 10/2012 |
| WO | 2009/110417 A1 | 9/2009 |
| WO | 2015/017036 A1 | 2/2015 |

OTHER PUBLICATIONS

JP Office Action for Japanese Patent Application No. 2023-115859, mailed on Apr. 23, 2024 with English Translation.
Communication dated Jun. 27, 2019, from the United States Patent and Trademark Office in counterpart U.S. Appl. No. 16/417,022.
Communication dated May 19, 2020 from Japanese Patent Office in JP Application No. 2017-566420.
International Search Report of PCT/JP2016/003159 daled Sep. 20, 2016 [PCT/ISA/210].
Written Opinion of PCT/JP2016/003159 dated Sep. 20, 2016 [PCT/ISA/237].
US Office Action for U.S. Appl. No. 17/684,648, mailed on Oct. 26, 2022.
JP Office Action for JP Application No. 2021-176613, mailed on Nov. 8, 2022 with English Translation.

\* cited by examiner

SURVEILLANCE SYSTEM WITH FIXED CAMERA AND TEMPORARY CAMERAS

CROSS REFERENCE TO RELATED APPLICATIONS

This application is a continuation application of U.S. patent application Ser. No. 17/684,642 filed on Mar. 2, 2022, which is a continuation application of U.S. patent application Ser. No. 17/113,974 filed on Dec. 7, 2020, which issued as U.S. Pat. No. 11,297,282, which is a continuation application of U.S. patent application Ser. No. 15/741,082 filed on Dec. 29, 2017, which issued as U.S. Pat. No. 10,893,239, which is a National Stage of International Application No. PCT/JP2016/003159 filed on Jul. 1, 2016, claiming priority based on Singapore Patent Application No. 10201505251X filed on Jul. 2, 2015, the contents of all of which are incorporated herein by reference in their entirety.

TECHNICAL FIELD

The invention relates to a surveillance system. More specifically, the invention relates to a surveillance system with a fixed camera and temporary cameras.

BACKGROUND ART

Surveillance systems such as video surveillance systems have been used in several areas for routine surveillance and for event detection. Abnormal events such as terrorism, riot, theft, fighting, fire, car accidents, etc. are meant to be captured by such surveillance systems.

However, in some situations, a fixed camera cannot capture abnormal events within the surveillance area due to dead angles, cost limitation and privacy concern. Therefore, security officers in command center cannot check what is going on in the field where no fixed camera covers.

Thus, what is needed is an improved surveillance system that extends coverage of fixed cameras and captures abnormal events within a surveillance area for better understanding of the abnormal events. Furthermore, other desirable features and characteristics will become apparent from the subsequent detailed description and the appended claims, taken in conjunction with the accompanying drawings and this background of the disclosure.

SUMMARY OF INVENTION

In a first aspect of the present invention, a surveillance system including a fixed camera and one or more temporary cameras and a control means coupled to the fixed camera and the one or more temporary cameras is disclosed. The control means is configured to extend coverage of the fixed camera using the one or more temporary cameras coupled to the fixed camera. Each of the one or more temporary cameras includes one or more sensors and is configured to be deployed and adjusted based on sensor data obtained from the one or more sensors of the one or more temporary cameras and from one or more fixed camera sensors co-located with the fixed camera.

In a second aspect of the present invention, a method for monitoring one or more area of interest using a fixed camera and one or more temporary cameras and a control means coupled to the fixed camera and the one or more temporary cameras is disclosed. The method includes obtaining sensor data from one or more sensors of the one or more temporary cameras and the one or more fixed camera sensors co-located with the fixed camera. The method further includes deploying and adjusting each of the one or more temporary cameras based on the obtained sensor data to extend coverage of the fixed camera using the one or more temporary cameras.

In a third aspect of the present invention, a non-transient computer readable medium containing program instructions for causing a computer to perform the method for monitoring one or more area of interest using a fixed camera and one or more temporary cameras and a control means (406) coupled to the fixed camera and the one or more temporary cameras is disclosed. The method includes obtaining sensor data from one or more sensors of the one or more temporary cameras and the one or more fixed camera sensor co-located with the fixed camera. The method also includes deploying and adjusting each of the one or more temporary cameras based on the obtained sensor data to extend coverage of the fixed camera using the one or more temporary cameras.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present embodiment.

Skilled artisans will appreciate that elements in the figures are illustrated for simplicity and clarity and have not necessarily been depicted to scale. For example, the dimensions of some of the elements in the simulation visualization or steps in the flowcharts may be exaggerated in respect to other elements to help improve understanding of the present embodiment.

DESCRIPTION OF EMBODIMENTS

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present an improved method for monitoring event related data.

Figure 1:
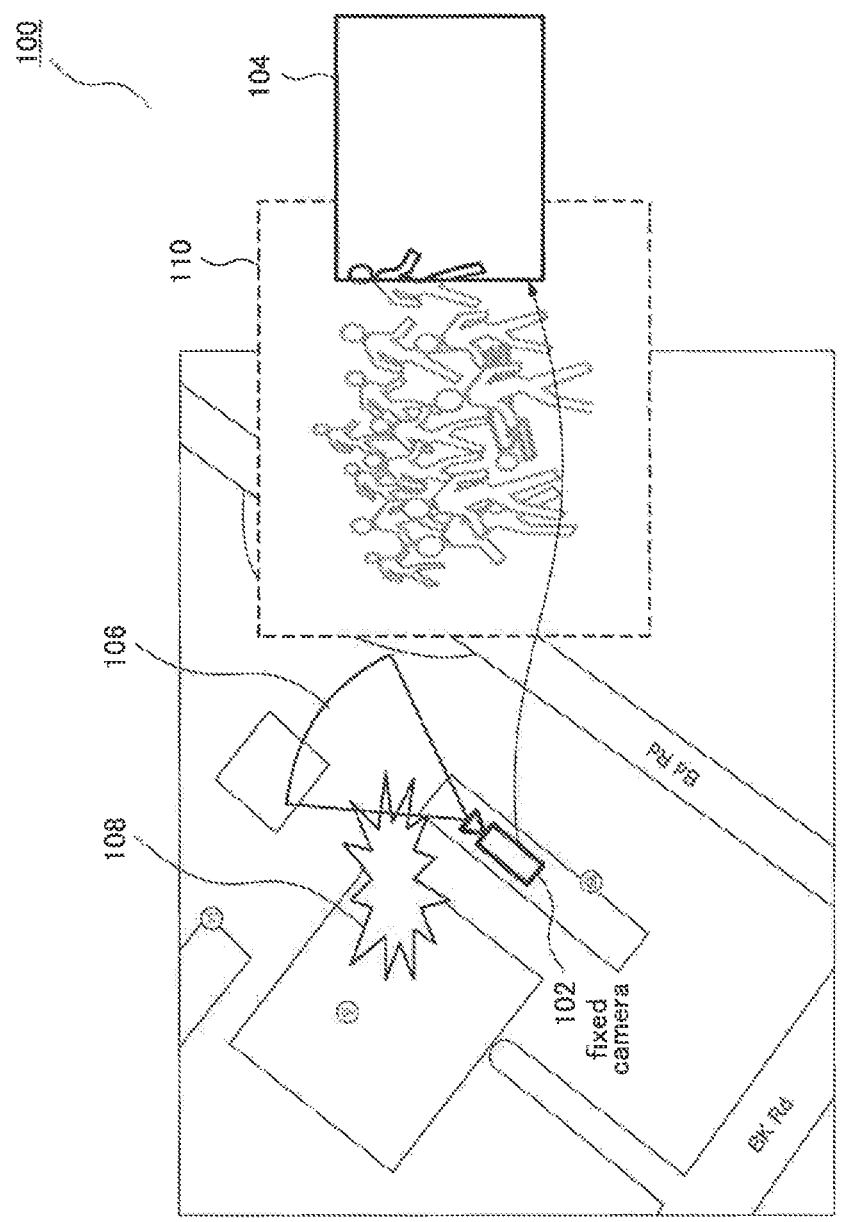
FIG. 1 depicts an incident captured by a fixed camera of a conventional surveillance system.

FIG. 1 depicts an incident captured by a fixed camera of a conventional surveillance system. As shown in FIG. 1, Field of View (FOV) 106 of a fixed camera 102 of conventional surveillance system is limited and cannot capture entire scene 110 of incident 108. In conventional surveillance system with the fixed camera 102, only limited information 104 is available for security officers in command center. Thus, it is difficult to understand the incident 108 which is not fully captured by Field of View 106 of the fixed camera 102.

To improve the conventional surveillance system with the fixed camera, temporary cameras are deployed to the location beyond the fixed cameras' coverage and where crime is increasing or some huge incident is planned, etc in accordance with the present embodiment. That is very important because the commanders in command center need to know what has really happened on the ground when the incident cannot be captured by the fixed cameras. The newly deployed temporary cameras will also connect and register themselves to a current network so that the video can be shared and the commanders can know where the temporary cameras are.

Figure 2:
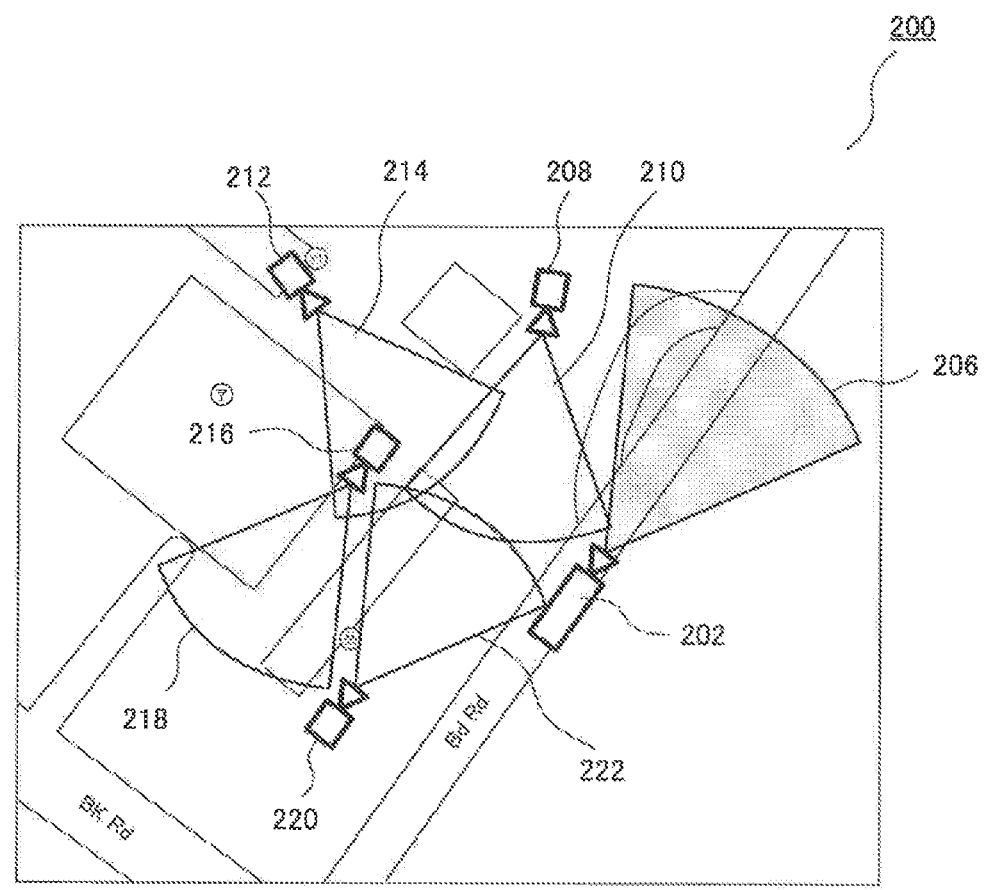
FIG. 2 depicts an example of coverage of fixed camera and temporary cameras in accordance with a present embodiment.

FIG. 2 depicts an example of coverage of fixed camera and temporary cameras in accordance with a present embodiment. In addition to fixed camera 202, four temporary cameras 208, 212, 216 and 220 are deployed beyond the fixed camera's coverage 206. As a result, the four temporary cameras 208, 212, 216 and 220 enable the surveillance system to cover the FOV 210, 214, 218 and 222.

Figure 3:
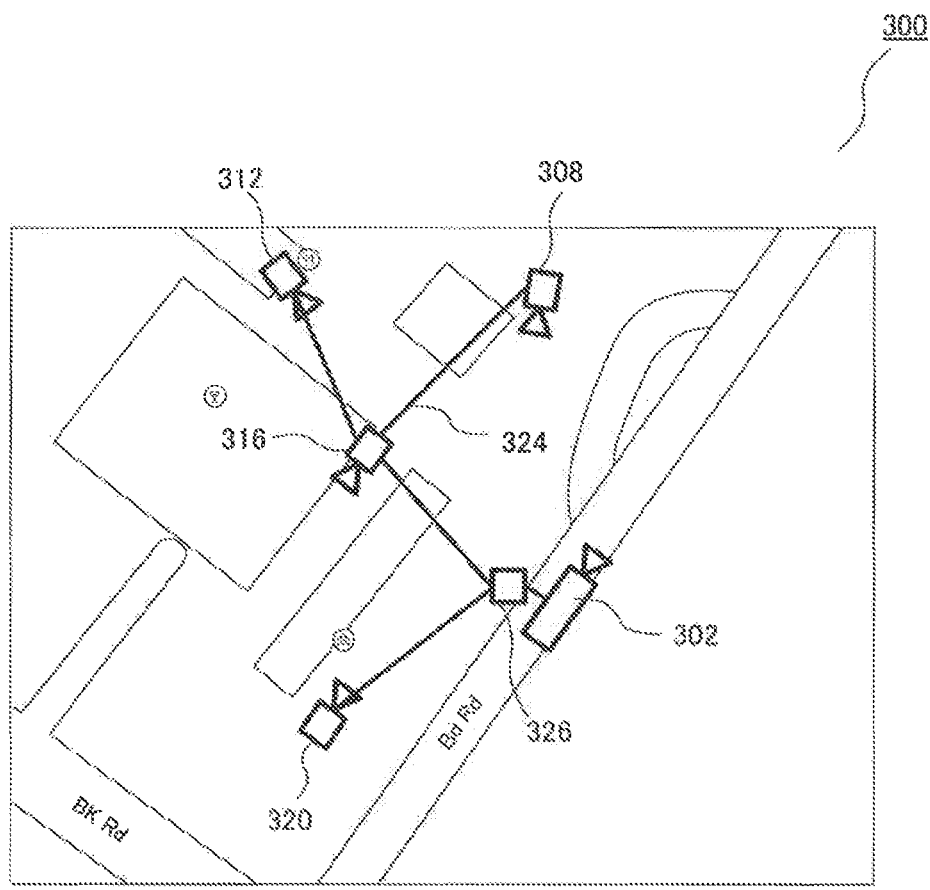
FIG. 3 depicts an example of connection of fixed camera and temporary cameras in accordance with a present embodiment.

As shown in FIG. 3, the newly deployed temporary cameras 308, 312, 316 and 320 are connected to the existing fixed camera 302 via e.g. ad hoc network for data relaying 324. The ad hoc network for data relaying 324 provides the surveillance system with flexibility for deployment of the temporary cameras 308, 312, 316 and 320. Also, data obtained from the temporary cameras 308, 312, 316 and 320 are sent to the fixed camera 302 and forwarded to command and control center 326.

Figure 4:
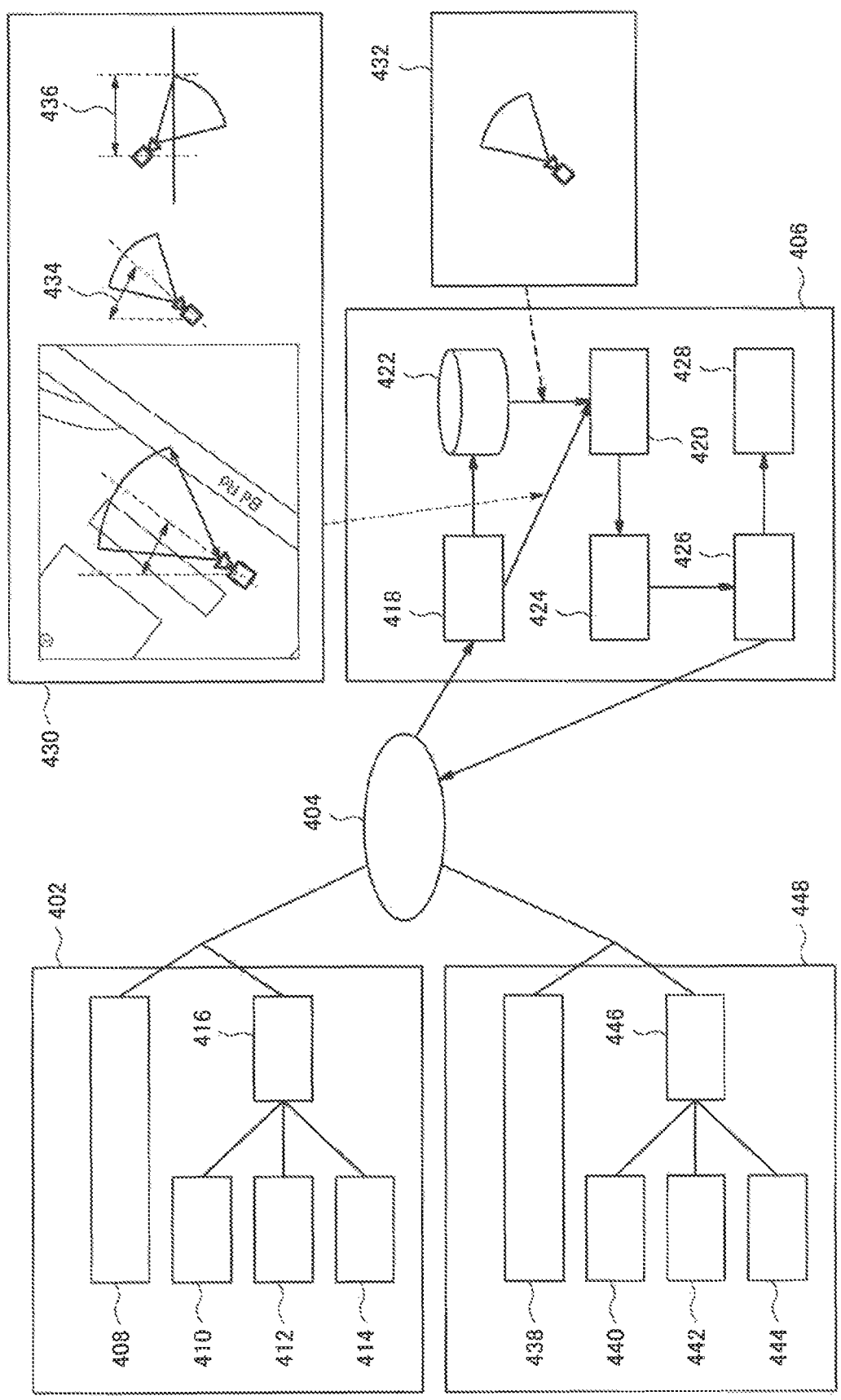
FIG. 4 depicts an exemplary architecture of the system in accordance with a present embodiment.

FIG. 4 depicts an exemplary architecture of the system in accordance with a present embodiment. For the registration process, each camera automatically registers their location to the system. Some important information such as location information and FOV information are shared in the system.

As shown in FIG. 4, Camera Management Client (CMC) 416 in temporary camera 402 gathers sensor data such as location data, directional data from sensors in the temporary camera 402 such as GPS receiver 410, Gyroscope 412, and Acceleration sensor 414 and transmits the gathered sensor data to control means 406 via network 404 together with surveillance camera images captured by camera 408 of the temporary camera 402. Similarly, CMC 446 of fixed camera 448 transmits sensor data gathered from sensors 440, 442 and 444 to control means 406 via network together with surveillance camera images captured by camera 438 of the fixed camera 448. Furthermore, the temporary camera 402 may include a microphone for obtaining sound data.

Camera Management Server (CMS) 418 of control means 406 receives data from CMC 416 and 446 and registers the data from CMC 416 and 446 in the control means 406. The CMS 418 sends coordination data 432 such as latitude and longitude of the temporary camera 402 and the fixed camera 448 to camera location database 422 and then forwards to FOV estimator 420. The CMS 418 also sends directional data 430 including horizontal direction 434 and vertical direction of the temporary camera 402 and the fixed camera 448 to FOV estimator 420. FOV estimator 420 estimates FOV of the cameras 402 and 448 based on horizontal direction 434 estimated by gyroscopes 412, 442 and distance 436 estimated by angle of depression (vertical direction) by acceleration sensors 414, 444. Furthermore, a compass is used for identifying the north direction. The compass is used to determine the direction of the camera.

Based on the estimated FOV, situational processor 424 calculates areas which are not captured by the estimated FOV (blind areas). Based on the blind areas calculated by the situational processor 424, attitude adjuster 426 sends feedback to all or some of cameras 402, 448 via network 404 to adjust position and/or direction of the cameras to cover the blind areas. After the position and/or direction are adjusted, the estimated FOV is sent to application 428 for security commanders.

Figure 5:
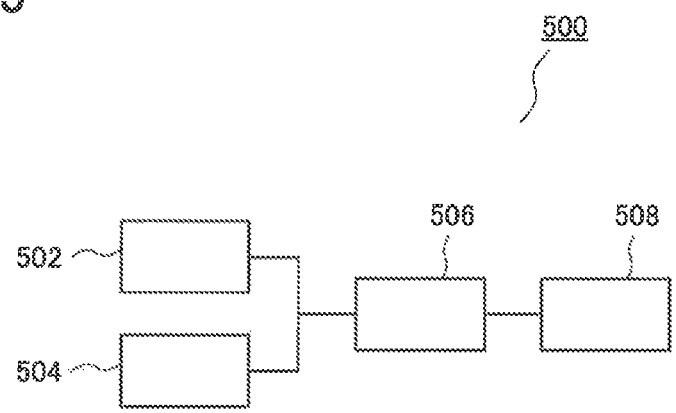
FIG. 5 depicts an exemplary block diagram of the system in accordance with a present embodiment.

FIG. 5 depicts an exemplary block diagram of system 500 in accordance with a present embodiment. In this configuration, the system 500 continuously receives the sensor data by sensor data receivers 502, 504 to estimate the FOV to be shown on map. In the first step, location sensor receiver 502 receives the coordination data from location sensor module such as GPS receiver. Also, attitude sensor receiver 504 receives the data from attitude sensor such as gyroscope, accelerometer and compass. In the second step, FOV estimator 506 estimates FOV by utilizing the sensor data. In the third step, the FOV estimator 506 transmits the estimated FOV to application 508 for displaying the information on map or providing the information in the other format.

Figure 6:
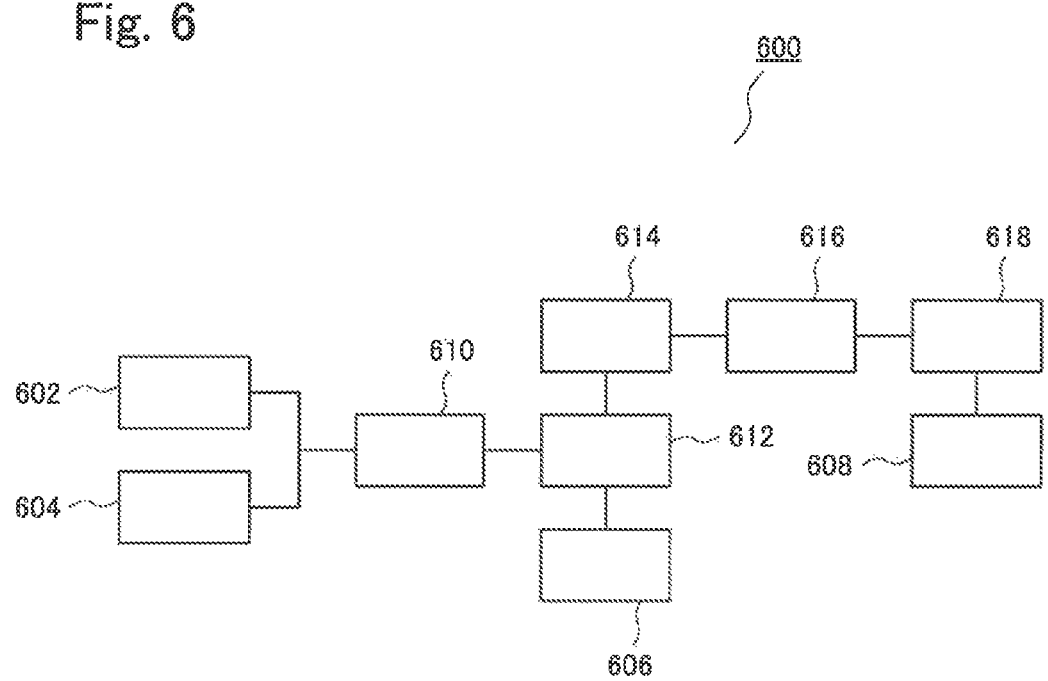
FIG. 6 depicts an exemplary block diagram of the system in accordance with a present embodiment.

FIG. 6 depicts an exemplary block diagram of system 600 in accordance with a present embodiment. In this configuration, during the registration process, the Camera Management Client (CMC) 610 collects the sensor data by sensor data receivers 602, 604 and analyzes them by Camera Management Server (CMS) 612. In the first step, location sensor receiver 602 receives the location data from location sensor module. Also, attitude sensor receiver 604 receives the data from attitude sensor module. In the second step, CMC 610 receives the data from all sensor data receivers 602, 604 and transmits the sensor data to CMS 612. In the third step, CMS 612 transmits the attitude data to estimate FOV module 606 in order to estimate FOV by utilizing the data. In the fourth step, CMS 612 stores location data and estimated FOV to camera location database 614. In the fifth step, Camera location database 614 transmits the location and FOV data to situational processing module 616 for calculating the parameters to identify both areas which are covered and not covered by the camera. In the sixth step, attitude control module 618 will adjust the attitude of temporary camera based on the estimated FOV data from database 614 to control the temporary camera point to the area of interest. In the seventh step, attitude control module 618 transmits the location and FOV data to application 608 to show camera location, cover area, FOV and play the real-time video.

Figure 7:
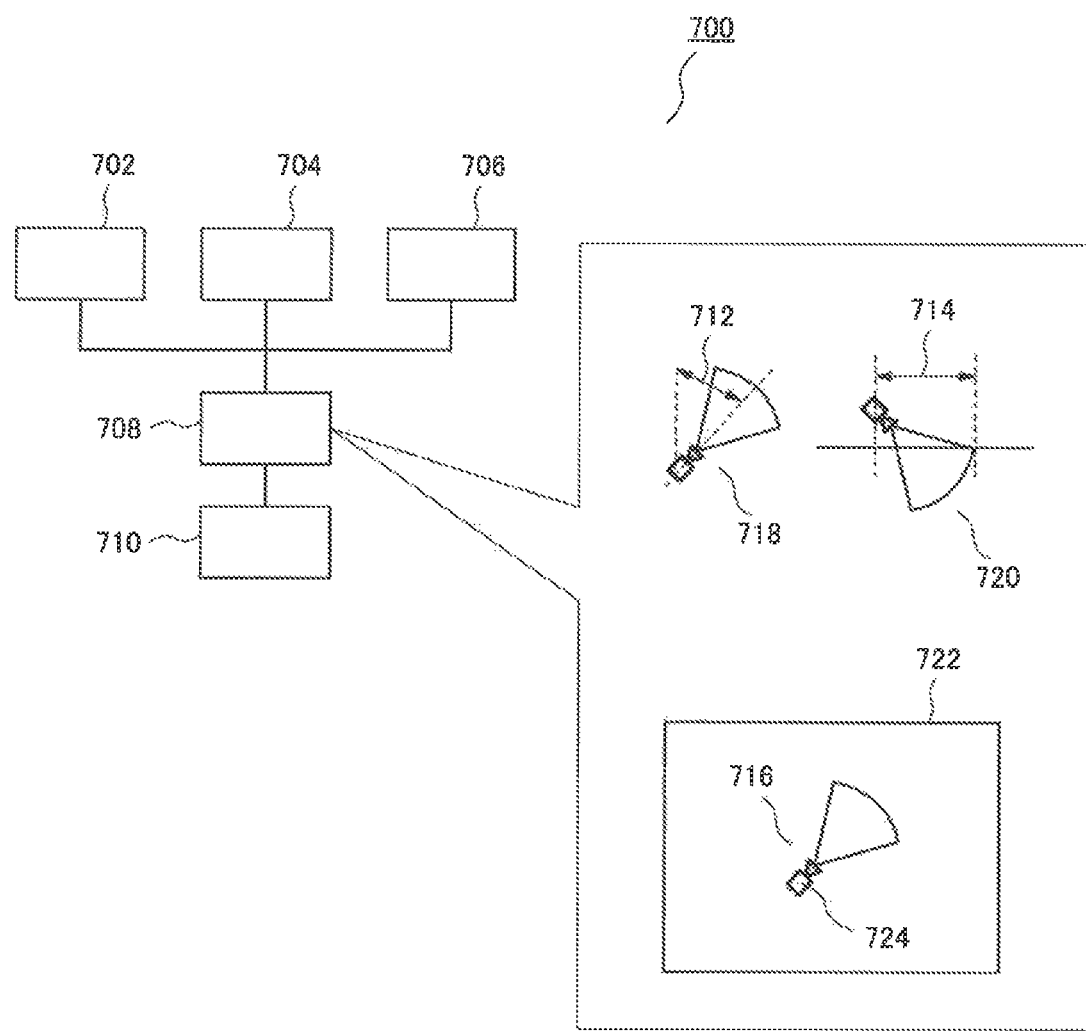
FIG. 7 depicts a block diagram of example 1 in accordance with a present embodiment.

FIG. 7 depicts a block diagram for Example 1 in accordance with a present embodiment. In the first step, location sensor receiver 706 receives the location data from GPS sensor module. Also, attitude sensor receivers 702 and 704 receive the compass data and acceleration data from compass sensor and acceleration sensor. In the second step, estimate FOV module 708 estimates FOV by estimating direction 712 of camera using the compass data as shown in top view 718, angle of depression using acceleration data as shown in side view 720, distance 714 using the angle of depression and typical height of the camera installation, and geo-location 716 of the camera on map 722 can be estimated by location data 724. In the third step, the estimated FOV is transmitted to application 710 to show camera location, FOV, and play the real-time video.

Figure 8:
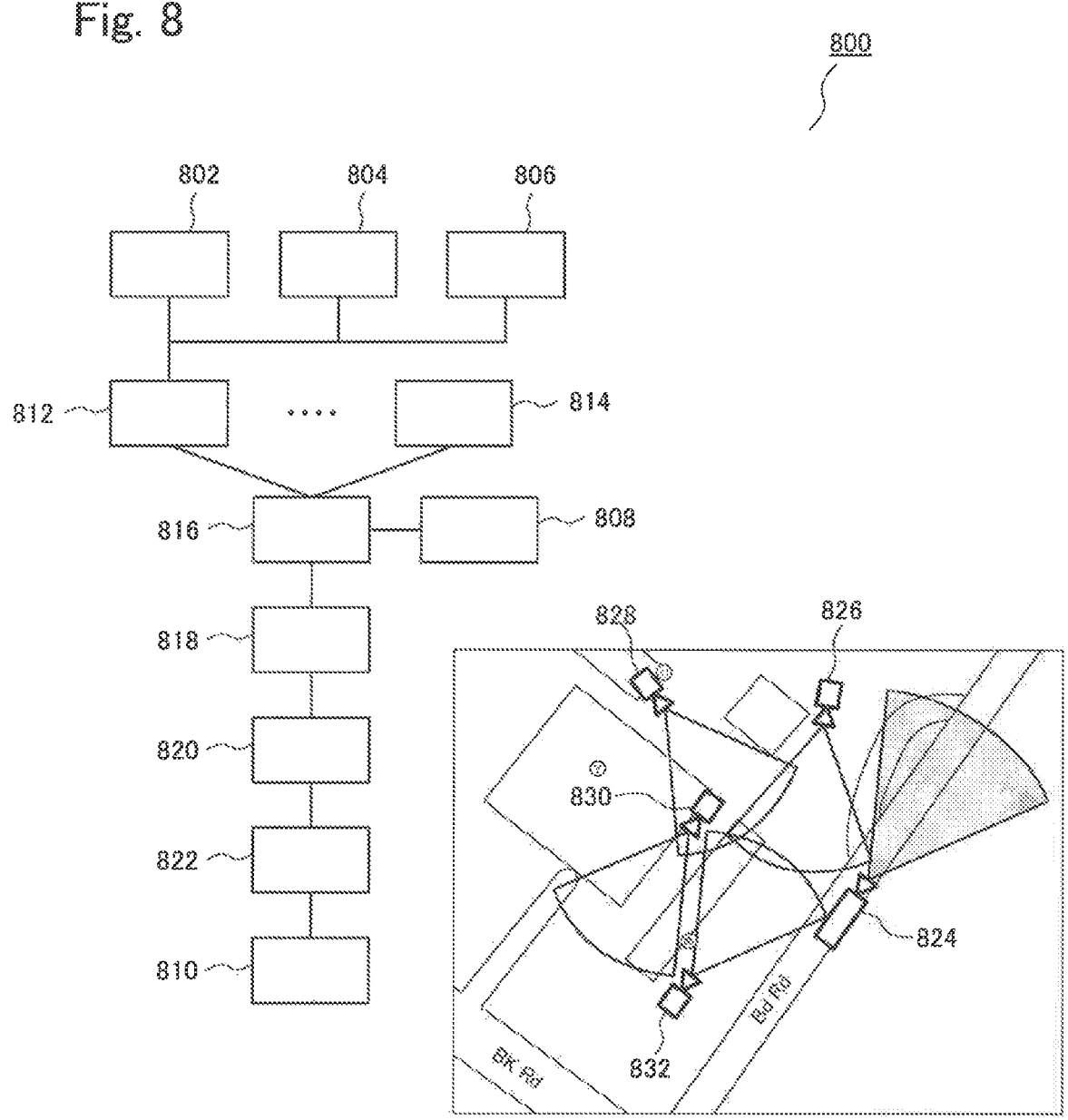
FIG. 8 depicts a block diagram of example 2 in accordance with a present embodiment.

FIG. 8 depicts a block diagram for Example 2 in accordance with a present embodiment. In the first step, location sensor receiver 806 receives the coordination data from GPS sensor module. Also, attitude sensor receivers 802 and 804 receive the compass data and acceleration data from compass sensor and acceleration sensor. In the second step, the Camera Management Clients (CMCs) 812, 814 receive coordination, compass and acceleration data from GPS receiver module 806, compass data receiver module 804 and acceleration data receiver module 802 and then transmits them to Camera Management Server (CMS) 816.

In the third step, Camera Management Server (CMS) 816 transmits multiple compass and acceleration data from each Camera Management Clients (CMCs) 812, 814 to estimate FOV module 808 so that the estimate FOV module 808 can estimate FOV for every camera by estimating direction of camera using the compass data, angle of depression using acceleration data, distance using angle of depression together with their typical height of the camera installation, and return the result back to the CMS 816.

In the fourth step, Camera Management Server (CMS) 816 stores each camera's ID, geo-location coordination, estimated direction and distance data to the camera location database 818. In the fifth step, Camera location database 818 transmits each camera's geo-location and FOV information together with the ID number to situational processing module 820 to calculate the parameters of angle, space and location to identify both areas which are covered and not covered by the camera. In the sixth step, attitude control module 822 will adjust the horizontal rotation angle using three-axis gyroscope, vertical rotation angle using tri-axial accelerometer and control height of temporary camera using pressure-altitude sensor data to control the temporary camera point to the area of interest. In the seventh step, attitude control module 822 transmits each camera's geo-location and FOV information together with the ID number to application 810 in order to show cameras' location, FOV and play the real-time video.

Figure 9:
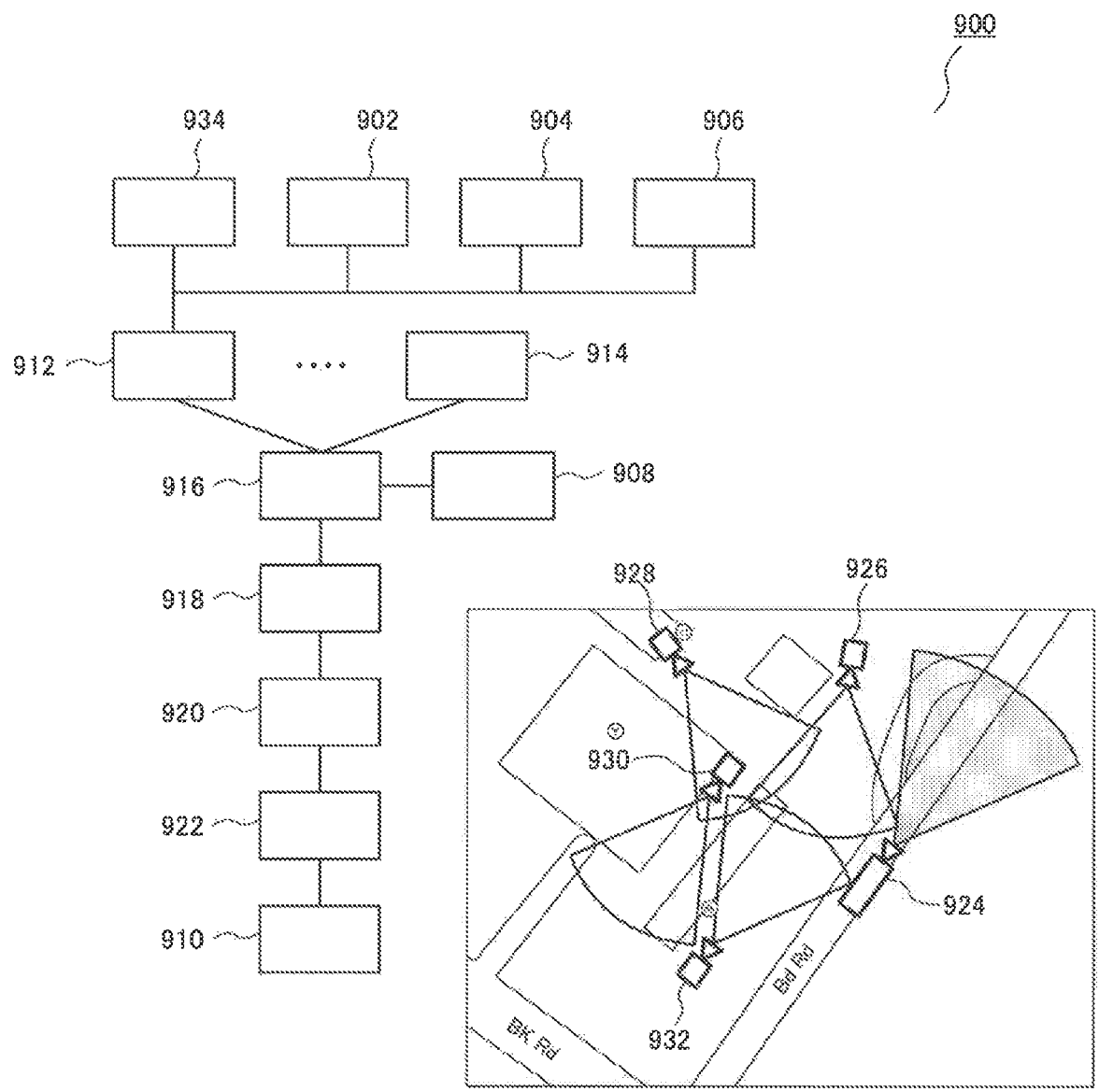
FIG. 9 depicts a block diagram of example 3 in accordance with a present embodiment.

FIG. 9 depicts a block diagram for Example 3 in accordance with a present embodiment. In the example 3, the system 900 uses precise height information by height sensor 934 instead of preset height information used in Examples 1 and 2. The precise height information is useful to get more accuracy of FOV estimate.

In the first step, location sensor receiver 906 receives the location data from GPS sensor module. Also, acceleration data receiver module 902, compass data receiver module 904, height data receiver module 934 receive the compass, acceleration data and height information from compass, acceleration and height sensor. In the second step, each of the Camera Management Clients (CMCs) 912, 914 receives coordination, compass, acceleration and height data from GPS receiver module 906, compass data receiver module 904, acceleration data receiver module 902 and height data receiver module 934 and then transmits them to Camera Management Server (CMS) 916. In the third step, Camera Management Server (CMS) 916 transmits multiple compass acceleration and height data from each of the Camera Management Clients (CMCs) 912, 914 to estimate FOV module 908 so that the estimate FOV module 908 can estimate FOV for cameras 924, 926, 928, 930 and 932 by estimating direction of camera using the compass data, angle of depression using acceleration data, distance using angle of depression together with their precise detected height of the camera installation, and return the result back to the CMS 916.

In the fourth step, Camera Management Server (CMS) 916 stores each camera's ID, geo-location coordination, estimated direction distance and height data to the camera location database 918. In the fifth step, Camera location database 918 transmits each camera's geo-location and FOV information, height together with the ID number to situational processing module 920 to calculate the parameters of angle, space and location to identify both areas which are covered and not covered by the camera.

In the sixth step, attitude control module 922 will adjust the horizontal rotation angle using three-axis gyroscope, vertical rotation angle using tri-axial accelerometer and control height of temporary camera using pressure-altitude sensor data to control the temporary camera point to the area of interest. In the seventh step, attitude control module 922 transmits each camera's geo-location and FOV information together with the ID number to application 910 in order to show location and FOV of cameras 924, 926, 928, 930 and 932 and play the real-time video of the cameras.

Examples 4 and 5 are based on the examples 1, 2, 3. The difference resides in the applications 710, 810 910. In example 4, the applications 710, 810, 910 can be in the command and control center, displaying one specific or location of multiple temporary camera with its real-time video, ID and surveillance area. The application can generate alert in case of capturing unusual incident.

In example 5, the applications 710, 810, 910 can be mobile applications, including for mobile vehicles or for smart phones, displaying location of one specific or multiple temporary camera with its real-time video, ID and surveillance area, and can generate alert in case of capturing unusual incident.

Figure 10:
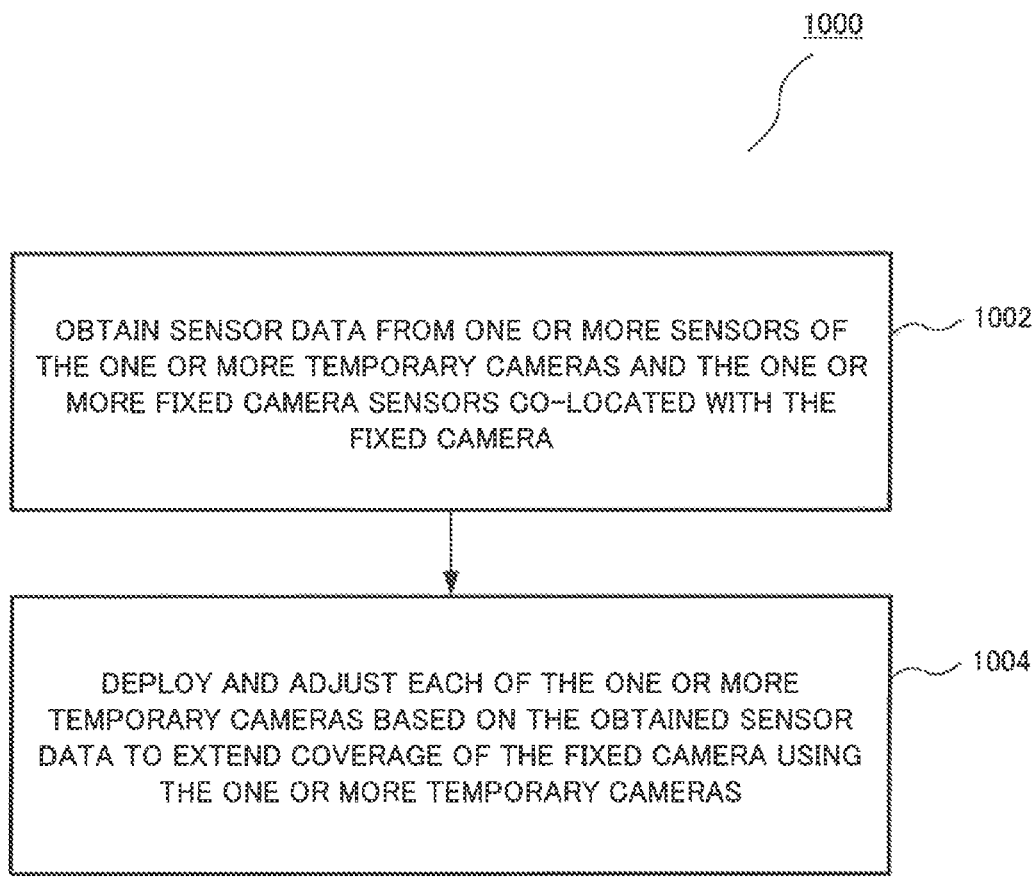
FIG. 10 depicts an exemplary flowchart of the method in accordance with a present embodiment.

FIG. 10 depicts an exemplary flowchart 1000 of the method in accordance with the present embodiment. As shown in step 1002, sensor data are obtained from one or more sensors of the one or more temporary cameras and the one or more fixed camera sensors co-located with the fixed camera. And then, as shown in step 1004, each of the one or more temporary cameras are deployed and adjusted based on the obtained sensor data to extend coverage of the fixed camera using the one or more temporary cameras.

Figure 11:
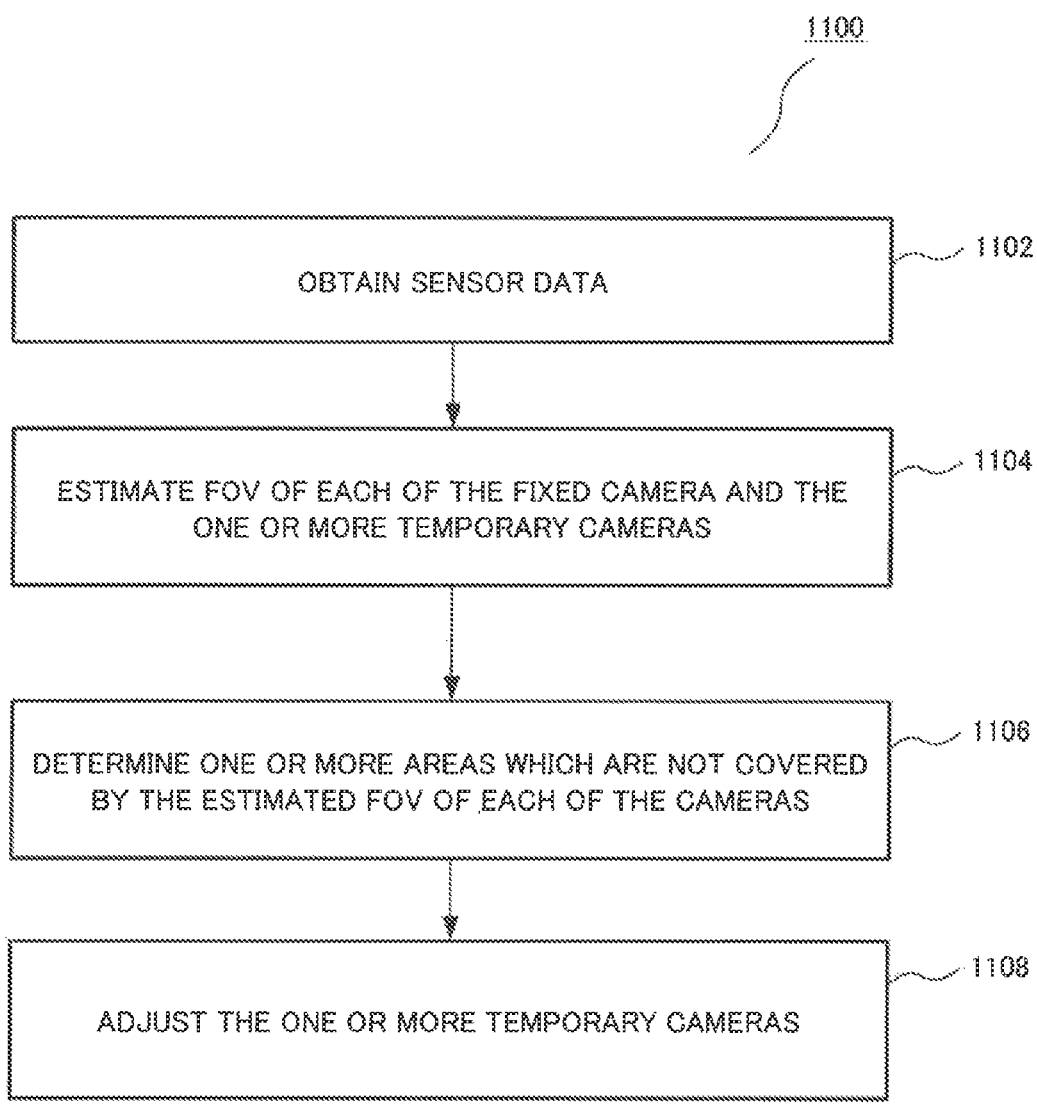
FIG. 11 depicts an exemplary flowchart of the method in accordance with a present embodiment.

FIG. 11 depicts an exemplary flowchart 1100 of the method in accordance with the present embodiment. Sensor data are obtained from one or more sensors of the one or more temporary cameras and the one or more fixed camera sensors co-located with the fixed camera (step 1102). And then, Field of View (FOV) of each of the fixed camera and the one or more temporary cameras are estimated based on the coordination data, the horizontal directional data, the vertical directional data and height information by a FOV estimator of the control means (step 1104). After that, one or more areas which are not covered by the estimated FOV of each of the fixed camera and the one or more temporary cameras within an area of interest are determined by a situational processor of the control means (step 1106). And then, horizontal rotation angle and/or vertical rotation angle and/or height of the one or more temporary cameras are adjusted by using the gyroscope and/or the accelerometer and/or the altitude sensor by one or more actuators of each of the temporary cameras to cover some or all of the one or more areas which are not covered by the estimated FOV of each of the one or more temporary cameras within the area of interest determined by the situational processor (step 1108).

In accordance with the present embodiment, the one or more temporary cameras are redeployed in response to the coordination data, the horizontal directional data, the vertical directional data and height information obtained from one or more sensors of the one or more temporary cameras and the one or more fixed camera sensors co-located with the fixed camera.

In one example, the command and control center can redeploy the temporary cameras by sending commands to security officers in the field to move the temporary cameras to additional locations or to raise/lower the cameras so that the command and control center can capture the area of interest more accurately.

The temporary cameras may be on a tripod or attached or temporarily affixed to a higher/lower location. The temporary cameras may be relocated flexibly with or without human intervention. In case the area of interest is expanded or shifted due to the consequence of the additional incidents, some of the temporary cameras are redeployed and/or new temporary cameras are deployed to capture the expanded or shifted area of interest. Also, ad-hoc network for redeployed or newly deployed temporary cameras may be set up and data from the temporary cameras may be transmitted to the command and control center via the ad-hoc network.

In accordance with the present embodiment, the temporary camera plays an auxiliary role compared to the fixed camera especially in some blind spots or potential crime site to make the current surveillance system flexible and robust to enhance the coverage of limited fixed cameras, which is very effective and efficient to deploy in the areas without network infrastructure, saving time and workload for manual configuration.

In accordance with the present embodiment, Camera Management Client (CMC) module integrated in the temporary camera communicates with Camera Management Server (CMS) installed in command and control center to achieve the temporary camera recognition and registration automatically as well as the situational processing and attitude adjustment. This enables not only one temporary camera to support the fixed camera, but also allow multiple temporary cameras' network communication, self-registration in a self-organized way as well as include the situational processing to calculate the area of interest and remote control function to adjust the attitude.

Figure 12:
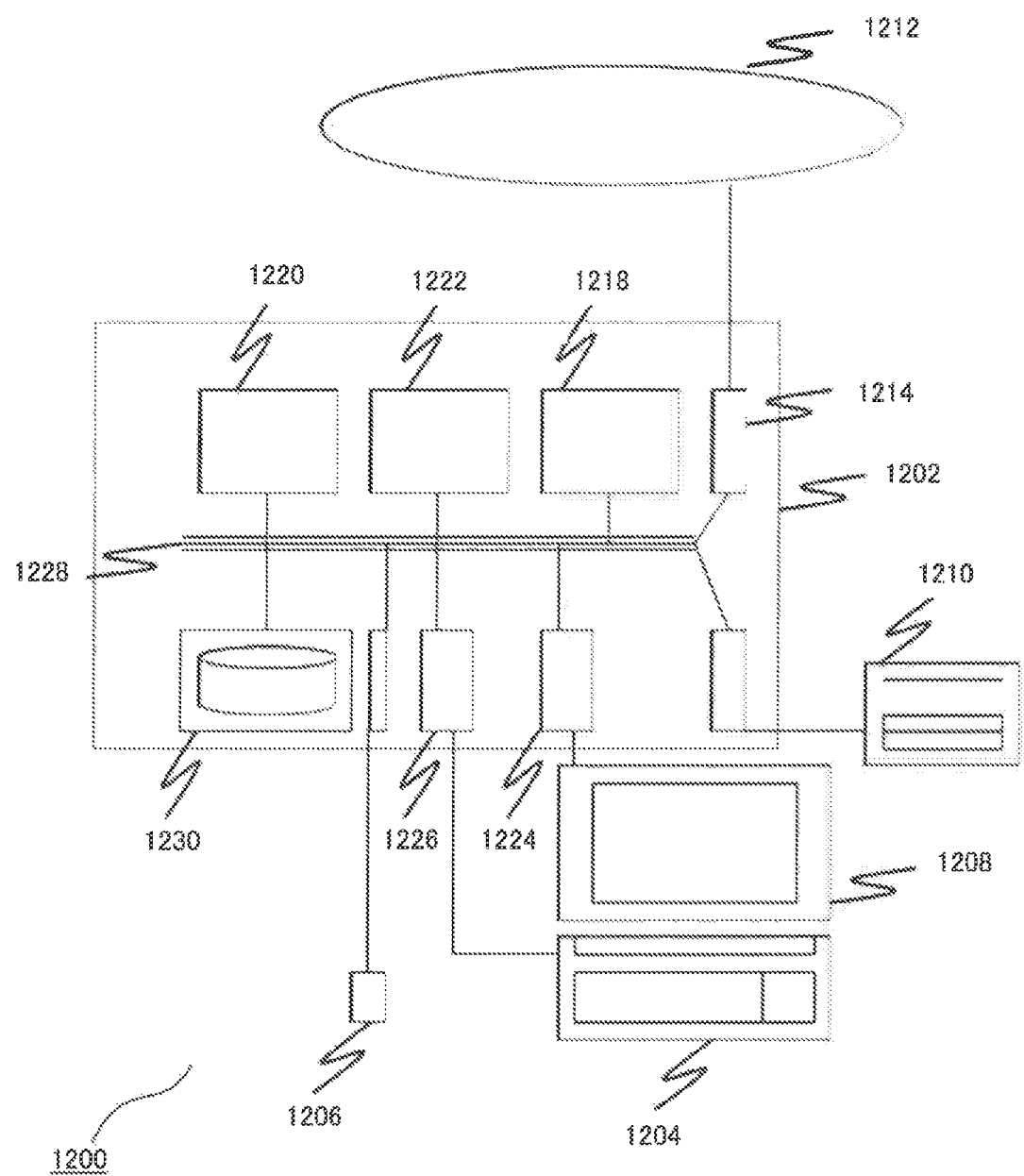
FIG. 12 depicts a computer system for implementing a method of monitoring event related data in accordance with a present embodiment.

The method and system of the described exemplary embodiments can be implemented on a computer system 1200, schematically shown in FIG. 12. It may be implemented as software, such as a computer program being executed within the computer system 1200, and instructing the computer system 1200 to conduct the method of the exemplary embodiments.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may include a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There may be many other variations of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The computer system 1200 includes a computer module 1202, input modules such as a keyboard 1204 and mouse 1206 and a plurality of output devices such as a display 1208, and printer 1210.

The computer module 1202 is connected to a computer network 1212 via a suitable transceiver device 1214, to enable access to e.g. the Internet or other network systems such as Local Area Network (LAN) or Wide Area Network (WAN).

The computer module 1202 in the example includes a processor 1218, a Random Access Memory (RAM) 1220 and a Read Only Memory (ROM) 1222. The computer module 1202 also includes a number of Input/Output (I/O) interfaces, for example I/O interface 1224 to the display 1208, and I/O interface 1226 to the keyboard 1204.

The components of the computer module 1202 typically communicate via an interconnected bus 1228 and in a manner known to the person skilled in the relevant art.

The application program is typically supplied to the user of the computer system 1200 encoded on a data storage medium such as a CD-ROM or flash memory carrier and read utilising a corresponding data storage medium drive of a data storage device 1230. The application program is read and controlled in its execution by the processor 1218. Intermediate storage of program data may be accomplished using RAM 1220.

While exemplary embodiments have been presented in the foregoing detailed description of the invention, it should be appreciated that a vast number of variations exist. For example, those skilled in the art will realize from the teachings herein that the present technology may also be applied to any part in the other type of chemical sensors.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention. It is understood that various changes may be made in the function and arrangement of elements and method of operation described in an exemplary embodiment without departing from the scope of the invention as set forth in the appended claims.

REFERENCE SIGN LIST

- 100 Incident captured by conventional fixed camera
- 102 Fixed camera
- 104 Incident captured by Fixed camera
- 106 Field of View of Fixed camera
- 108 Place of Incident
- 110 Entire Incident
- 200 Coverage of fixed camera and 4 temporary cameras
- 202 Fixed camera
- 206 Field of View of Fixed camera
- 208 Temporary camera 1
- 210 Field of View of Temporary camera 1
- 212 Temporary camera 2
- 214 Field of View of Temporary camera 2
- 216 Temporary camera 3
- 218 Field of View of Temporary camera 3
- 220 Temporary camera 4
- 222 Field of View of Temporary camera 4
- 300 Connection of fixed camera and 4 temporary cameras
- 302 Fixed camera
- 308 Temporary camera 1
- 312 Temporary camera 2
- 316 Temporary camera 3
- 320 Temporary camera 4
- 324 Ad hoc network for data relaying
- 326 Link to Command and Control Center
- 400 Architecture of system
- 402 Temporary camera
- 404 Network
- 406 Control means
- 408 Camera
- 410 GPS receiver
- 412 Gyroscope
- 414 Acceleration sensor
- 416 Camera Management Client
- 418 Camera Management Server
- 420 FOV Estimator
- 422 Camera Location Database
- 424 Situational processor
- 426 Attitude Adjuster
- 428 Application
- 430 horizontal and vertical Direction data
- 432 Coordination data
- 434 horizontal direction
- 436 distance
- 438 Camera
- 440 GPS receiver
- 442 Gyroscope
- 444 Acceleration sensor
- 446 Camera Management Client
- 448 Fixed camera
- 500 Exemplary Block diagram for an embodiment
- 502 Location sensor receiver
- 504 Attitude sensor receiver
- 506 FOV Estimator
- 508 Application
- 600 Exemplary Block diagram for an embodiment
- 602 Location sensor receiver
- 604 Attitude sensor receiver
- 606 FOV Estimator
- 608 Application
- 610 Camera Management Client
- 612 Camera Management Server
- 614 Camera Location Database
- 616 Situational processing
- 618 Attitude controller
- 700 Exemplary Block diagram for an embodiment
- 702 Acceleration data receiver
- 704 Compass data receiver
- 706 GPS data receiver
- 708 FOV Estimator
- 710 Application
- 712 Direction
- 714 Distance
- 716 Geo-location
- 718 Top view
- 720 Side view
- 722 Map
- 724 longitude, latitude
- 800 Exemplary block diagram for an embodiment
- 802 Acceleration data receiver
- 804 Directional data receiver
- 806 GPS data receiver
- 808 FOV Estimator
- 810 Application
- 812 Camera Management Client #1
- 814 Camera Management Client #N
- 816 Camera Management Server
- 818 Camera Location Database
- 820 Situational processing
- 822 Attitude control
- 824 Fixed Camera
- 826 Temporary Camera 1
- 828 Temporary Camera 2
- 830 Temporary Camera 3
- 832 Temporary Camera 4
- 900 Exemplary block diagram for an embodiment
- 902 Acceleration data receiver
- 904 Directional data receiver
- 906 GPS data receiver
- 908 FOV Estimator
- 910 Application
- 912 Camera Management Client #1
- 914 Camera Management Client #N 916 Camera Management Server
918 Camera Location Database
920 Situational processing
922 Attitude control
924 Fixed Camera
926 Temporary Camera 1
928 Temporary Camera 2
930 Temporary Camera 3
932 Temporary Camera 4
934 Altitude data receiver
1000 Flow chart in accordance with an embodiment
1002 Obtain sensor data from one or more sensors co-located with cameras
1004 Adjust one or more temporary cameras based on the obtained sensor data
1100 Flowchart in accordance with an embodiment
1102 Obtain sensor data
1104 Estimate FOV of each of cameras
1106 Determine one or more areas which are not covered by the estimated FOV of cameras
1108 Adjust the one or more temporary cameras
1200 Computer system
1202 Computer module
1204 Keyboard
1206 Mouse
1208 Display
1210 Printer
1212 Computer network
1214 Suitable transceiver device
1218 Processor
1220 Random Access Memory (RAM)
1222 Read Only Memory (ROM)
1224 I/O interface to display
1226 I/O interface to keyboard
1228 Interconnected bus
1230 Data storage device

The invention claimed is:

1. A system comprising:
   a first device;
   a second device configured to capture an image and move in response to receiving a signal and connect to the first device;
   at least one memory storing instructions; and
   at least one processor configured to execute the instructions to:
   receive information indicating a direction and a position of the first device;
   receive information indicating a direction and a position of the second device;
   display, on a map of a display, a first direction and a first position, the first direction and the first position being regarding the first device based on the information indicating the direction and the position of the first device, the first direction and the first position being displayed as a first graphic; and
   display, on the map of the display, a second direction and a second position, the second direction and the second position being regarding the second device based on the information indicating the direction and the position of the second device, the second direction and the second position being displayed as a second graphic, the second graphic being different from the first graphic in design for displaying the display.

2. The system according to claim 1, wherein the at least one processor is further configured to execute instructions to display an image captured by the second device with the map on the display, the image being captured in real-time.

3. The system according to claim 1, wherein the at least one processor is installed in a smartphone.

4. The system according to claim 1, wherein the second device is configured to control height for capturing the image.

5. The system according to claim 1, wherein the first device is configured to capture an image.

6. The system according to claim 1, wherein the first device comprises the at least one memory storing instructions and the at least one processor configured to execute the instructions.

7. A method comprising:
   by a computer,
   receiving information indicating a direction and a position of a first device;
   receiving information indicating a direction and a position of a second device, the second device being configured to capture an image and move in response to receiving a signal and connect to the first device;
   displaying, on a map of a display, a first direction and a first position, the first direction and the first position being regarding the first device based on the information indicating the direction and the position of the first device, the first direction and the first position being displayed as a first graphic; and
   displaying, on the map of the display, a second direction and a second position, the second direction and the second position being regarding the second device based on the information indicating the direction and the position of the second device, the second direction and the second position being displayed as a second graphic, the second graphic being different from the first graphic in design for displaying the display.

8. The method according to claim 7, further comprising, by the computer,
   displaying an image captured by the second device with the map on the display, the image being captured in real-time.

9. An apparatus comprising:
   at least one memory storing instructions; and
   at least one processor configured to execute the instructions to:
   receive information indicating a direction and a position of a first device;
   receive information indicating a direction and a position of a second device, the second device being configured to capture an image and move in response to receiving a signal and connect to the first device;
   display, on a map of a display, a first direction and a first position, the first direction and the first position being regarding the first device based on the information indicating the direction and the position of the first device, the first direction and the first position being displayed as a first graphic; and
   display, on the map of the display, a second direction and a second position, the second direction and the second position being regarding the second device based on the information indicating the direction and the position of the second device, the second direction and the second position being displayed as a second graphic, the second graphic being different from the first graphic in design for displaying the display.

10. The apparatus according to claim 9, wherein the at least one processor is further configured to execute instructions to display an image captured by the second device with the map on the display, the image being captured in real-time.

* * * * *